United States Patent [19]

Dominguez

[11] 4,420,570

[45] Dec. 13, 1983

[54] REACTION INJECTION MOLDED ELASTOMER CONTAINING AN INTERNAL MOLD RELEASE MADE BY A TWO-STREAM SYSTEM

[75] Inventor: Richard J. G. Dominguez, Austin, Tex.

[73] Assignee: Texaco Inc., White Plains, N.Y.

[21] Appl. No.: 417,260

[22] Filed: Sep. 13, 1982

[51] Int. Cl.³ .................... C12P 13/16; C12P 17/04
[52] U.S. Cl. .......................... 521/112; 264/328.2;
                            264/328.6; 264/DIG. 83; 521/126
[58] Field of Search ..................... 521/112, 126;
                            264/328.2, 328.6, DIG. 83

[56] References Cited

U.S. PATENT DOCUMENTS

| | | | |
|---|---|---|---|
| 3,523,918 | 8/1970 | Gonzales | 260/2.5 |
| 3,838,076 | 9/1974 | Moss et al. | 260/2.5 AQ |
| 4,130,698 | 12/1978 | Sparrow et al. | 521/130 |
| 4,218,543 | 8/1980 | Weber et al. | 521/126 X |
| 4,246,363 | 1/1981 | Turner et al. | 521/163 |
| 4,254,069 | 3/1981 | Dominguez et al. | 264/51 |
| 4,269,945 | 5/1981 | Vanderhider et al. | 521/159 |
| 4,272,618 | 6/1981 | Dominguez et al. | 521/160 |
| 4,273,885 | 6/1981 | Dominguez et al. | 521/126 X |
| 4,281,096 | 7/1981 | Nomura et al. | 264/328.2 X |
| 4,314,962 | 2/1982 | Wollensak et al. | 264/328.6 |
| 4,314,963 | 2/1982 | Boden et al. | 264/328.6 |
| 4,374,210 | 2/1983 | Ewen et al. | 521/159 |

OTHER PUBLICATIONS

Amine Modified Polyols in Reinforced Polyurethane RIM Elastomers, Cornell, et al., SPI, 1482, Session 5A.
Dow-Corning—New Product Information—Dow-Corning® Q2-7119 Fluid for RIM Internal Release.

*Primary Examiner*—Lucille M. Phynes
*Attorney, Agent, or Firm*—Robert A. Kulason; Jack H. Park; Kenneth R. Priem

[57] ABSTRACT

The invention is a method of making a molded reaction injection molded elastomer which will release from its mold with reduced frequency of application of external mold release agents. The reaction injection molded (RIM) elastomer is made by injecting exactly two streams via a RIM machine into a mold cavity of the desired configuration, a formulation comprising in the first stream a high molecular weight polyhydric polyether, a low molecular weight active hydrogen containing compound of at least two functionality and an internal mold release agent, and in the second stream an aromatic polyisocyanate and tin catalyst in an amount equal to 100% of the tin catalyst present in the formulation. The resulting RIM elastomer may be removed from the mold easily. RIM elastomers are useful, for example, for automobile body parts.

9 Claims, No Drawings

REACTION INJECTION MOLDED ELASTOMER CONTAINING AN INTERNAL MOLD RELEASE MADE BY A TWO-STREAM SYSTEM

This application is related to application Ser. No. 119,705 filed Feb. 8, 1980, now abandoned; application Ser. No. 371,161 filed Apr. 23, 1982, now U.S. Pat. No. 4,396,729.

BACKGROUND OF THE INVENTION

1. Field of the Invention

This invention concerns the field of reaction injection molded elastomers containing internal mold release agents.

2. Description of the Prior Art

Reaction injection molded elastomers such as polyurethanes are becoming quite popular as automobile body parts and other applications. These materials must be molded into the desired shape and demolded quickly to be economical. Heretofore, external mold release agents were applied to the inside of the mold before the injection of the reactive streams which would form the RIM part. A new product called Dow-Corning® Q2-7119 Fluid, which is a dimethyl siloxane with organic acid groups, has been developed for use in polyurethane RIM elastomers to avoid the necessity of an external application of mold release agent. However, since in polyurethane systems a tin catalyst is required for proper reactivity of the system and since the Dow-Corning product mentioned above is reactive with and not compatible with tin catalysts or isocyanates, a third stream was necessary for the use of the internal mold release agent or the tin catalyst concentration was required to be adjusted. Product bulletins concerning the Dow-Corning internal mold release agent advise that premixing the internal mold release agent with the polyol would result in some gellation of the premix.

Most commercial RIM machines are of the two stream variety, thus limiting the application of the Dow-Corning product.

We have discovered a method whereby the internal mold release agent described above may be used in a two-stream system to make a RIM elastomer of superior properties.

SUMMARY OF THE INVENTION

The invention is a method of making a RIM elastomer which will release from its mold with reduced frequency of application of external mold release agents comprising injecting exactly two streams via a RIM machine into a mold cavity of the desired configuration, a formulation comprising in the first stream a high molecular weight polyhydric polyether, a low molecular weight active hydrogen containing compound of at least two functionality and an internal mold release agent, and in the second stream an aromatic polyisocyanate and tin catalyst in an amount equal to 100% of the tin catalyst present in the formulation. The invention is also the resulting RIM elastomer made from the method above.

DESCRIPTION OF THE PREFERRED EMBODIMENTS

The polyols useful in the process of this invention include polyether polyols, polyester diols, triols, tetrols, etc., having an equivalent weight of at least 500, and preferably at least 1000 up to about 3000. Those polyether polyols based on trihydric initiators of about 4000 molecular weight and above are especially preferred. The polyethers may be prepared from lower alkylene oxides such as ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention.

The chain extenders useful in the process of this invention are preferably difunctional. Mixtures of difunctional and trifunctional chain extenders are also useful in this invention. The chain extenders useful in this invention include diols, amino alcohols, diamines or mixtures thereof. Low molecular weight linear diols such as 1,4-butanediol and ethylene glycol have been found suitable for use in this invention. Other chain extenders including cyclic diols such as 1,4-cyclohexane diol and ring containing diols such as bis-hydroxyethylhydroquinone, amide or ester containing diols or amino alcohols, aromatic diamines such as diethyl toluene diamine and aliphatic amines would also be suitable as chain extenders in the practice of this invention. Diethyl toluene diamine is an especially preferred chain extender.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene-bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. are useful. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

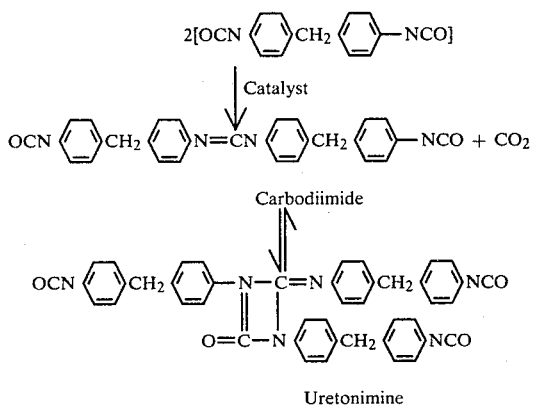

Uretonimine

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

The RIM formulation includes a great number of other recognized ingredients such as additional cross-linkers—catalysts, extenders, blowing agents and the like. Blowing agents may include halogenated low-boiling hydrocarbons, such as trichloromonofluoromethane and methylene chloride, carbon dioxide, nitrogen, etc., used.

Catalysts such as tertiary amines or an organic tin compound or other polyurethane catalysts are useful. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g. trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines, such as N,N,N′N′-tetramethyl-1, 3-butanediamine.

The mold release agents useful for the method of this invention are internal mold release agents. The preferred mold release agent is Dow-Corning Q2-7119 which is a dimethyl siloxane with organic acid group manufactured by Dow-Corning Corp. Other conventional formulation ingredients may also be employed, such as, for example, foam stabilizers, also known as silicone oils or emulsifiers. The foam stabilizer may be an organic silane or siloxane. For example, compounds may be used having the formula:

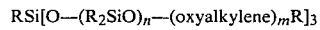

RSi[O—(R$_2$SiO)$_n$—(oxyalkylene)$_m$R]$_3$ wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

The following examples demonstrate my invention. They are not to be construed as limiting the invention in any way, but merely to be exemplary of the improvement and manner in which the invention may be practiced.

EXAMPLE I

A RIM elastomer was made using the following formulation. The tin catalyst (FOMREZ UL-28, dibutyltin dilaurate) is in the B-component in the conventional manner.

| B-Component | |
|---|---|
| MULTRANOL 3901* | 80 pbw |
| Diethyltoluenediamine (DETDA) | 17.7 pbw |
| FORMEZ UL-28 (DBTDL) | 0.5 pbw |
| A-Component | |
| MONDUR ® PF** | 46.8 pbw |

*Conventional 6500 molecular weight ethylene oxide capped polyether polyol. Product of Mobay.
**High 4,4′ containing MDI quasi-prepolymer. Product of Mobay.

The above weight ratio yields an elastomer with an isocyanate index of 1.05. The properties are given in Table 1.

EXAMPLE II

This example is the same as Example I except for two factors: (a) the tin catalyst (FOMREZ UL-28) is dissolved in the A-component instead of the B-component, and (b) the total amount of tin catalyst is 0.4 times that in Example I. The properties are given in Table 1.

EXAMPLE III

An internal mold release, Dow-Corning Q2-7119 fluid, is added in the B-component of the formulation of Example II (0.72 parts). This mold release cannot be added to the conventional B-component (Example I) because it contains tin catalyst. The mold release interacts negatively with the tin catalyst producing a very poor material. Also, the mold release cannot be added to conventional A-components since it loses its mold release qualities. Thus, to date it has only been used in three-stream equipment. However, this is different than the standard two-stream practice used today in RIM and would necessitate costly and time-consuming modifications. However, by adding the catalyst to the A-component as in Example II, these problems are avoided since the Q2-7119 can be added to the B-component. In fact, this was done in this example. Whereas the mold must be waxed each time for conventional RIM elastomers, several shots can be made into a mold without rewaxing with the elastomer of this example. In fact, four or five shots can be made without sticking. Also, the mold release improves the properties as can be seen in Table 1.

TABLE 1

| Material | Example I | Example II | Example III |
|---|---|---|---|
| Tensile, psi | 3430 | 3070 | 3000 |
| Elongation, % | 290 | 310 | 320 |
| Tear, pli | 390 | 380 | 360 |
| Heat sag, in 1 hour at 250° F. | 1.21 | 1.77 | 1.15 |

Although the above table shows that the properties of Example II are not quite as good as Example I, they are almost as good and were achieved with only 0.4 times as much catalyst in Example I. Also, this extends the practice of our invention to other chain extenders (DETDA) and isocyanates (MONDUR PF).

I claim:

1. A method for making a reaction injection molded elastomer which will release from its mold with reduced frequency of application of external mold release agents comprising injecting exactly two streams via a RIM machine into a mold cavity of the desired configuration, a formulation comprising in the first stream a high molecular weight polyhydric polyether, a low molecular weight active hydrogen containing compound of at least two functionality and an internal mold release agent, and in the second stream an aromatic polyisocyanate and tin catalyst in an amount equal to 100% of the tin catalyst present in the formulation.

2. A method as in claim 1 wherein the low molecular weight active hydrogen containing compound is an amine terminated polyether having a functionality of about 2 to 6.

3. A method as in claim 2 wherein the functionality of the amine terminated polyethers is from about 2 to 3.

4. A method as in claim 1 wherein the polyhydric polyether has a molecular weight greater than about 2,500.

5. A method as in claim 1 where the internal mold release agent comprises a dimethyl siloxane with organic acid groups.

6. A method for making a RIM elastomer which will release from its mold with reduced frequency of application of external mold release agents comprising injecting exactly two streams via a RIM machine into a mold cavity of the desired configuration, a formulation comprising in the first stream a polyhydric polyether of above about 5000 molecular weight, a low molecular weight active hydrogen containing compound of at least two functionality and an internal mold release agent, and in the second stream an aromatic polyisocyanate and tin catalyst in an amount equal to 100% of the tin catalyst present in the formulation.

7. A method as in claim 6 wherein the low molecular weight active hydrogen containing compound is an amine terminated polyether having a functionality of about 2 to 6.

8. A method as in claim 7 wherein the functionality of the amine terminated polyethers is from about 2 to 3.

9. A method as in claim 6 where the internal mold release agent comprises a dimethyl siloxane with organic acid groups.

* * * * *